(12) United States Patent
Burtis (10) Patent No.: US 12,448,953 B2
(45) Date of Patent: Oct. 21, 2025

(54) SOLAR ENERGY DIRECTED TO A CYLINDER CONTAINING A PROPELLER USED TO GENERATE ELECTRICITY

(71) Applicant: Warren Arthur Burtis, San Geronimo, CA (US)

(72) Inventor: Warren Arthur Burtis, San Geronimo, CA (US)

( * ) Notice: Subject to any disclaimer, the term of this patent is extended or adjusted under 35 U.S.C. 154(b) by 0 days.

(21) Appl. No.: 19/072,242

(22) Filed: Mar. 6, 2025

(65) Prior Publication Data

US 2025/0243850 A1    Jul. 31, 2025

Related U.S. Application Data

(63) Continuation-in-part of application No. 18/587,674, filed on Feb. 26, 2024, now Pat. No. 12,258,946.

(60) Provisional application No. 63/576,661, filed on Feb. 27, 2023.

(51) Int. Cl.
| | |
|---|---|
| *F03G 6/04* | (2006.01) |
| *F03D 9/00* | (2016.01) |
| *F03D 9/35* | (2016.01) |
| *F24S 23/71* | (2018.01) |
| *H02K 7/18* | (2006.01) |

(52) U.S. Cl.
CPC ............. *F03G 6/045* (2013.01); *F03D 9/007* (2013.01); *F03D 9/35* (2016.05); *F24S 23/71* (2018.05); *H02K 7/183* (2013.01)

(58) Field of Classification Search
CPC ... F03G 6/045; F03D 9/35; F03D 9/37; F03D 9/39; F03D 9/007; F05B 2240/131; F05B 2260/24
See application file for complete search history.

(56) References Cited

U.S. PATENT DOCUMENTS

| | | | |
|---|---|---|---|
| 6,016,015 A * | 1/2000 | Willard, Jr. ............. | F03D 13/20 290/55 |
| 8,232,665 B2 | 7/2012 | Sato | |
| 9,291,150 B2 | 3/2016 | Bassett | |
| 9,453,495 B2 | 9/2016 | Coffey | |

(Continued)

FOREIGN PATENT DOCUMENTS

| | | | | |
|---|---|---|---|---|
| IT | 202200000218 U1 * | 7/2023 | ............. | F03D 3/005 |
| WO | WO-2011035415 A1 * | 3/2011 | ............... | F03D 1/04 |

*Primary Examiner* — Mark A Laurenzi
*Assistant Examiner* — Xiaoting Hu
(74) *Attorney, Agent, or Firm* — Steven A. Nielsen; www.NielsenPatents.com (57) ABSTRACT

An elevated or ground level vertical cylinder houses one or more propellers and/or turbines that are rotated by heated air convection within or around or above the cylinder. The rotating shafts of the propellers generate electricity in an area at the bottom of or below the cylinder. For added, improved air flow directions and volumes; and, for stabilization of the rotating shaft or shafts, a cone structure is disposed below the cylinder. Heat is directed to the cylinder by a plurality of sun tracking concave mirrors that are positioned in concentric circles at various heights. The cylinder may be composed of concrete, ceramics, metal compounds or other materials and operate with a surface temperature that may range from 70 to 1,300 degrees Fahrenheit. Disclosed embodiments include the use of heat sinks, internal blades disposed upon pyramid structures and flexible vanes and flaps.

10 Claims, 12 Drawing Sheets

(56) References Cited

U.S. PATENT DOCUMENTS 9,995,507 B2     6/2018    Norman et al.
2013/0328319 A1    12/2013    Guo \* cited by examiner

SOLAR ENERGY DIRECTED TO A CYLINDER CONTAINING A PROPELLER USED TO GENERATE ELECTRICITY

RELATED PATENT APPLICATION AND INCORPORATION BY REFERENCE

This is a utility application is a continuation in part (CIP) of utility application Ser. No. 18/587,674 filed on Feb. 26, 2024 which was based upon and claims priority form U.S. patent application 63/576,661 filed on Feb. 27, 2023. The related applications are incorporated herein by reference and made a part of this application. If any conflict arises between the disclosure of the invention in this utility application and that in the related application, the disclosure in this utility application shall govern. Moreover, the inventor incorporates herein by reference any and all patents, patent applications, and other documents hard copy or electronic, cited or referred to in this application.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to the generation of electricity by use of a shaft rotated by air movement. More particularly, the invention relates to the use of an elevated cylinder receiving heat from concave solar tracking parabolic mirrors with the resulting upward air flow rotating a propeller and shaft. A circular pyramid base or cone structure is disposed upon the ground and within the cylinder to assist in air flow and securing the rotation shaft.

(2) Description of the Known Related Art

U.S. application 2013/0328319 A1 by Guo, published on Dec. 12, 2013 is an example of the prior art's penchant for using exterior shrouds or funnels to direct wind into a wind driven power generating device. The structure of Guo is incompatible with the disclosed embodiments.

U.S. Pat. No. 8,232,665 issued to Sato on Jul. 31, 2012 presents a columnar member comprising a plurality of wind inlets. The voids of the Sato system prevent effective heating of air near the turbine. Thus, Sato teaches away from the disclosed embodiments.

U.S. Pat. No. 9,890,769 issued to Albert on Feb. 13, 2018 presents a system used in building attic spaces where warmed air is pre-existing. Hot attic air enters a funnel and is directed to a horizontally mounted turbine. The structure of Albert works with interior pre-heated air only and by design does not accept outdoor ambient air, which is intentionally kept out by virtue of the funnel and wall system. Moreover, the introduction of outdoor ambient air would cool the interior attic air and destroy the intended purpose of Albert. Thus, Albert teaches away from the disclosed embodiments which use outdoor air only.

U.S. Pat. No. 9,543,945 issued to Coffey on Sep. 27, 2016 discloses an exterior vertical wall system that comprises vertical spaced apart turbine blades. The space between the blades makes heating air near or within the system impractical.

U.S. Pat. No. 9,291,150 issued to Bassett on Mar. 22, 2016 discloses a cone support structure under or within a vertical cylindrical blade drum. The blade drum is in direct communication with ambient air. Bassett teaches away from the disclosed embodiments of using a cylinder to heat and enclose air used to turn a propeller or turbine. Moreover, the cone structure in Bassett does nothing to direct or improve the flow of air to the turbine blades. Bassett highlights a common shortfall in the art by requiring wind driven electrical generation to occur in windy areas. The use of wind power to generate is currently unduly limited to areas that are unusually windy. Thus, there is a need in the art for the presently disclosed embodiments.

BRIEF SUMMARY OF THE INVENTION

The present invention overcomes shortfalls in the related art by presenting an unobvious and unique combination, configuration and use of elevated hollow cylinders, propellers using shaft in shaft rotational transmission, lower cone structures to direct air flow from the bottom of the cylinders and upwardly into the cylinders and to secure the rotation shafts. Outdoor ambient air within or near a hollow cylinder is heated with concentrated solar energy or concentrated solar power (CSP) by use of exterior parabolic concave reflectors or mirrors. The parabolic concave mirrors direct heat or CSP to the cylinder or other exterior structure or heat retaining housing to cause the internal cylinder air to rise thus moving the propellers and rotating the shafts to generate electricity.

An elevated cylinder may be made of concrete or other material of suitable thermal qualities and be capable of tolerating surface and internal temperatures in the range of 70 to 1,300 degrees Fahrenheit. The elevated cylinder is elevated to overcome shortfalls in the art that fail to draw air from the bottom of a system to provide a continuous air flow while at the same time heating the air near the propeller by heating the walls of the housing or cylinder. Alternative embodiments include cylinders or other exterior housing structures to be disposed at ground level, with ground level air inlets allowing ambient air to enter. The bottom edges of a cylinder may even be subterranean with duct work to allow air to enter the bottom portions of such a cylinder or housing.

The disclosed embodiments overcome shortfalls in the related art by presenting an elevated and vertically oriented cylinder that is configured to heat air near a propeller or turbine while at the same time provide a continuous air flow to a propeller or turbine.

The disclosed embodiments overcome shortfalls in the related art by the venturi effect created by the shape of the wind and shaft support cone which increases the air intake to the cylinder. Moreover, airflow is further increased by the convention heating that increases as temperatures increase upon the cylinder.

The lower circular pyramid structure or cone structure provides an exterior concave arc for improved air flow into the bottom of the cylinder. The top end or top void of the pyramid structure provides an advantage of comprising a collar or bearing to further secure the vertically disposed rotating shaft.

Alternative embodiments include the use of other shapes for the cylinder or outer structure or heat retaining housing.

Such shapes include an hourglass, and funnel shapes with the wide base at the top or bottom. Various exterior structure shapes may provide a venturi effect drawing air upwardly at a greater rate of speed.

The cylinders or other heat retaining housings may be heated by a plurality of concave solar tracking parabolic mirrors.

The known related art fails to disclose, suggest or teach the use of the disclosed physical structures or theory of operation.

REFERENCE NUMERALS IN THE DRAWINGS

100 Solar heated elevated cylinder system
110 cylinder
112 exterior surface of cylinder
114 interior surface of cylinder
115 upper end of cylinder
116 upper void of cylinder defined by circular cylinder wall
117 lower end of cylinder
118 lower void of cylinder defined by circular cylinder wall
120 wind blade void defined within inner surface of cylinder wall
150 support structure of cylinder
200 circular pyramid base or wind and shaft support cone
210 upper void of wind and shaft support cone
218 lower edge of wind and shaft support cone
220 lower void of wind and shaft support cone
230 outer surface of wind and shaft support cone
300 upper or first propeller
305 blade of upper propeller
310 distal tip of upper propeller
320 rotational shaft or first rotational shaft of upper or first propeller
350 lower or second propeller
355 blade of lower propeller
360 distal tip of lower propeller
370 rotational shaft of lower or second propeller
400 power generator
500 chimney and $CO_2$ removal system
510 outer chimney wall or chimney funnel
512 shadow of chimney funnel
520 fabric disposed around the chimney funnel
530 solar heat platform
540 perimeter platform skeleton
545 fabric disposed over the perimeter platform skeleton
542 platform support posts
560 $CO_2$ and water storage containers
570 air blade turbines of chimney and $CO_2$ removal system
600 reflective mirror or solar tracking parabolic concave mirror
630 support pole for solar tracking parabolic concave mirror
700 ground level
800 free wheeling fan blades
820 Flexible vanes and flaps
860 lower pyramid and fan assembly
870 alternative embodiment
900 a first heat sink embodiment
905 a second heat sink embodiment These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Figure 1:
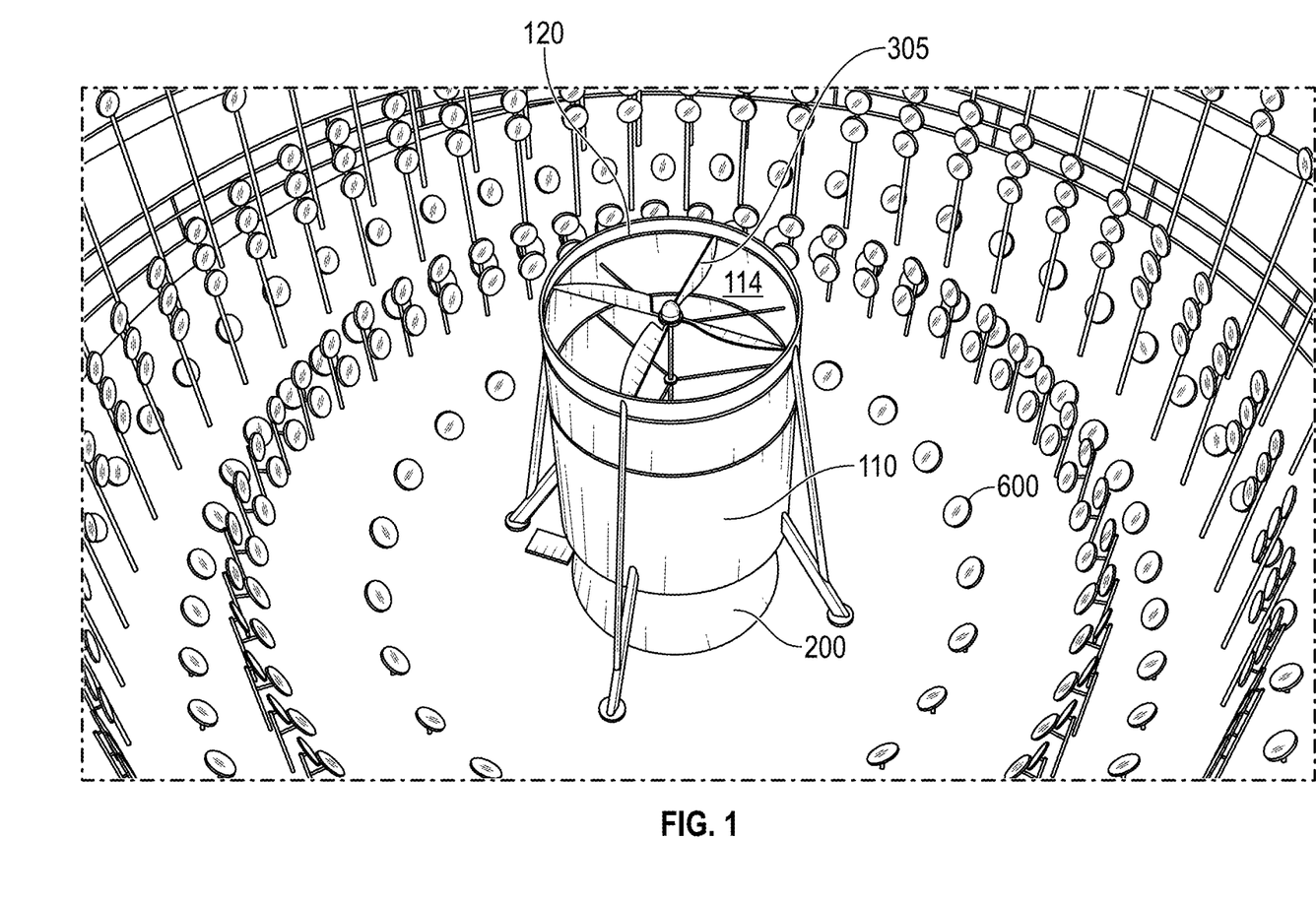
FIG. 1 is a top and side perspective view of a disclosed embodiment

Referring to FIG. 1, a solar heated elevated cylinder system 100 is shown in a park-like setting. A wind and shaft support cone 200 has a bottom portion defining a bottom void that has a greater diameter as compared to the upper portion that defines the upper void. The proportionally or shape overcomes shortfalls in the related art by providing a stable base while providing room for air flow at the bottom of the cylinder.

At the top portion of the cylinder 110, and inside surface 114 defines a wind blade void 120. A distal tip 305 of a propeller or upper propeller may be contained with the wind blade void to provide added stability to the propeller.

Figure 2:
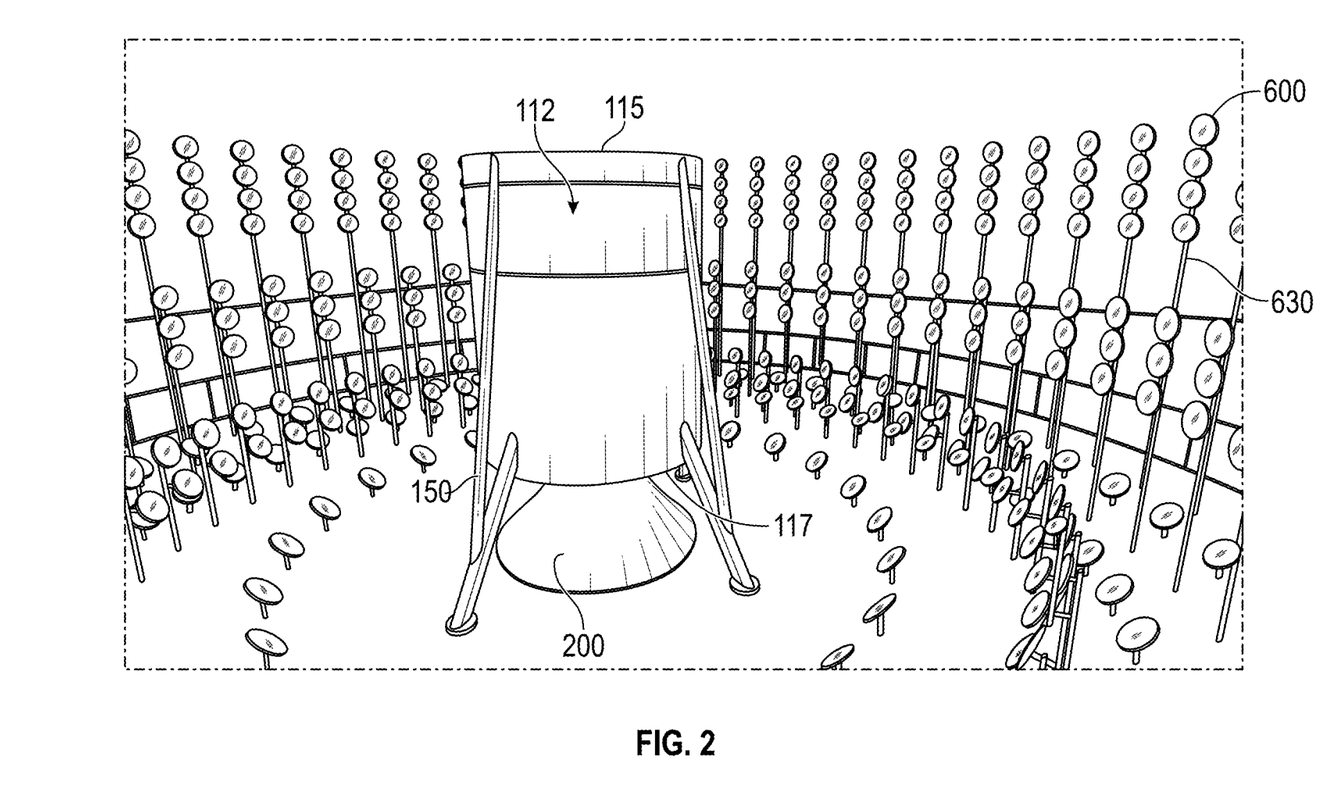
FIG. 2 is a side perspective view of a disclosed embodiment

Referring to FIG. 2, a cylinder is shown having an outer surface 112 with the outer surface receiving solar energy or heat from a plurality of mirrors 600 that are sometimes supported by support poles 630. A support structure 150 positions the bottom portion 117 of the cylinder above the ground. This above ground positioning in conjunction with the wind and shaft support cone provide operational advantages in that ambient air may be drawn from the bottom of the cylinder and further allowed or directed into the cylinder by the narrow or narrowing portions of the wind and shaft support cone 200.

Disclosed embodiments may include one or more turbines, propeller systems or other power generation systems disposed at or near or in proximity to the cylinder so as to take advantage of concentrated solar energy or concentrated solar power (CSP) produced by the exterior parabolic concave reflectors or mirrors.

Figure 3:
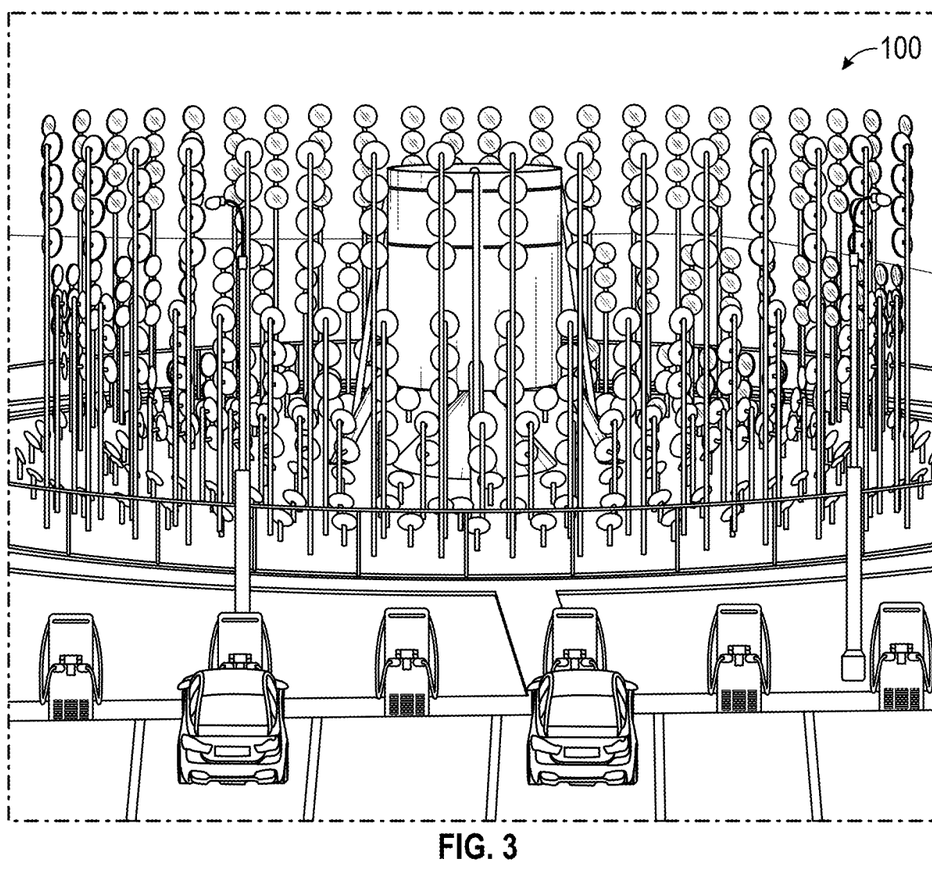
FIG. 3 is a side perspective view of a disclosed embodiment and environmental elements

Referring to FIG. 3, a dislocated system 100 is shown in conjunction with electric vehicles and electric vehicle charging stations. The relative compact design of the system allows for a plurality of systems to be installed along roadways or freeways.

Figure 4:
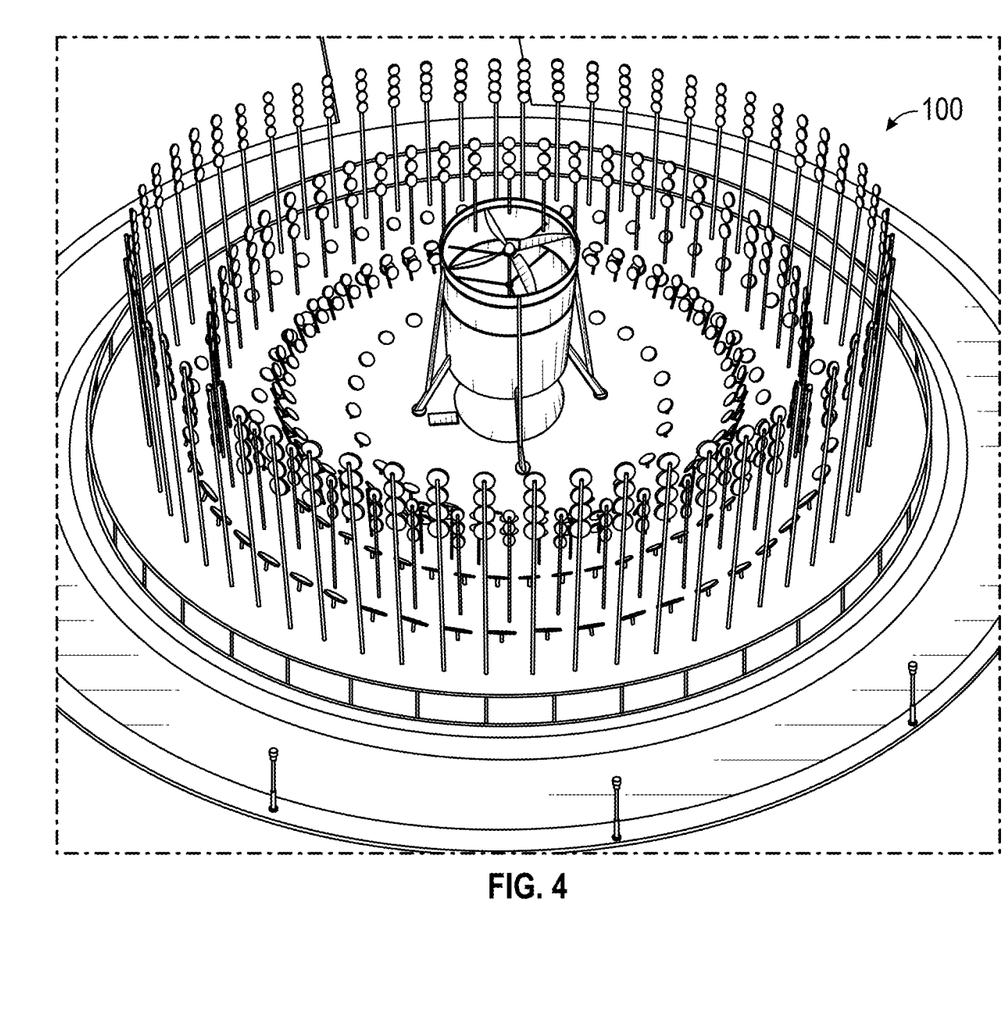
FIG. 4 is a top and side perspective view of a disclosed embodiment and environmental elements

Referring to FIG. 4, a disclosed system 100 is shown in the center of a plurality of concave parabolic reflective mirrors disposed upon support poles. Such mirrors may be movable and programed to rotate to track the position of the sun or otherwise be solar tracking. The mirrors may be positioned in concentric circles around the cylinder and elevated at varying heights to maximize the solar energy or heat directed to and delivered to the cylinder.

Figure 5A:
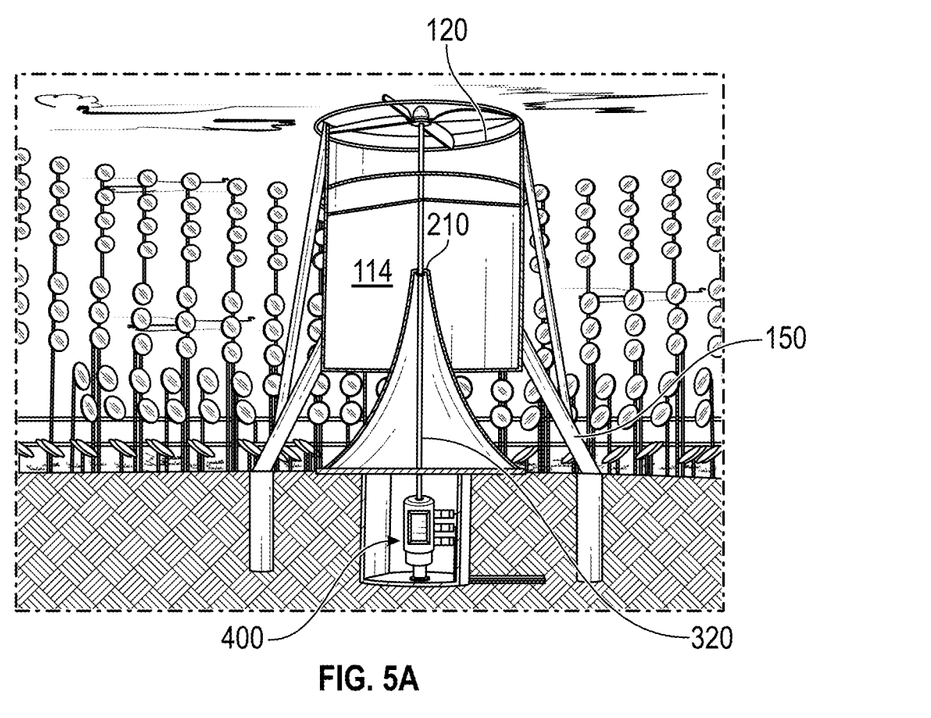
FIG. 5A is a sectional view of a disclosed embodiment

Referring to FIG. 5A a sectional view of a disclosed embodiment shows the inside surface 114 of the cylinder defining a wind blade void 120. Optionally a track may be used to secure or guide the tip of a blade during movement with the track attached to the inside surface of the cylinder.

The upper void 210 of the wind and shaft support cone will accept a rotating shaft. The upper void may also contain a bearing or other mechanism of securing the rotating shaft or concentric shafts in a two propeller/turbine system.

Below ground level 700 or within the cone, a power generator 400 may be in mechanical connection with the rotating shaft to convert the rotation of the shaft into electricity.

With respect to the inner and/or outer surfaces of the cylinder and/or cone structure, upwardly spiraling protrusions channels, bumps, rivulets, bands, rifling or cyclonic twisting may be of benefit in increasing upward airflow convection speed. Such upward spiraling caused by such spiral grooves overcomes shortfalls in the art by maximizing the probability to intermix for mingled-molecular heat conduction/absorption/transfer off of the cylinder and conde surfaces. Expanded per air molecule separation-distances therefore occurs to lighten the air; which increases upward airflow convection speed. The inner cylinder lightened air mass [i.e., greatly lowered air pressure inside cylinder] will then be constantly energized via heat derived from exterior Concentrated Solar Power "CSP" mirrors.

Figure 5B:
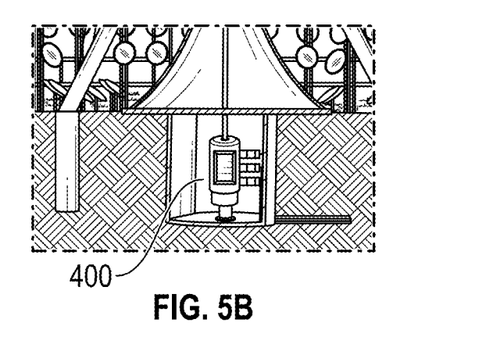
FIG. 5B is a sectional and subterranean view of a power generation system

Referring to FIG. 5B, a power generator 400 is shown in connection with the rotating shaft.

Figure 6:
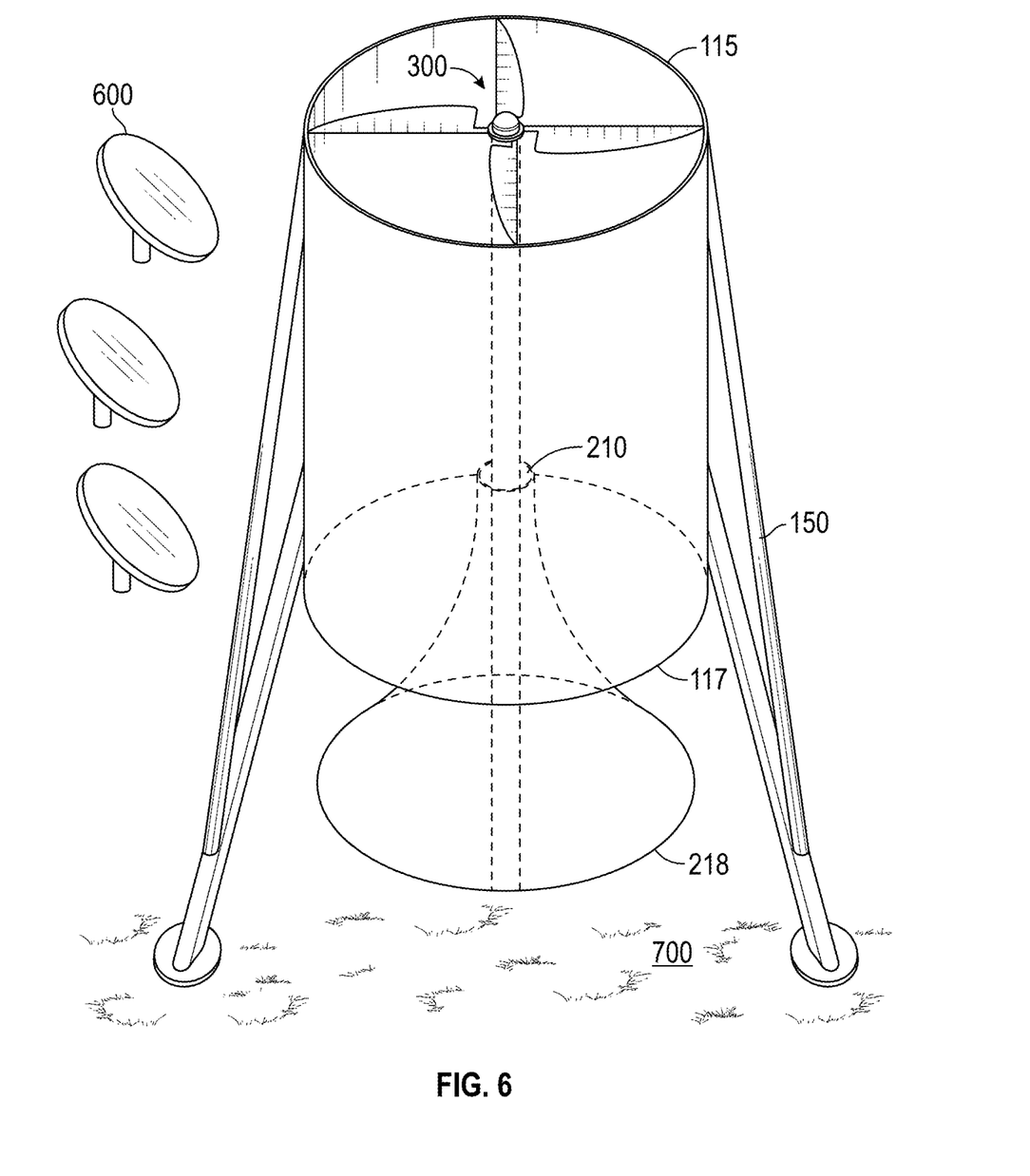
FIG. 6 is a sectional view of a disclosed embodiment

Referring to FIG. 6, a sectional view of a disclosed system 100 is shown with the lower edge 218 of the wind and shaft support cone resting on the ground 700. Reflective mirrors are directing sunlight towards the cylinder. A top or upper propeller 300 is shown disposed at the upper end of the cylinder.

Figure 7:
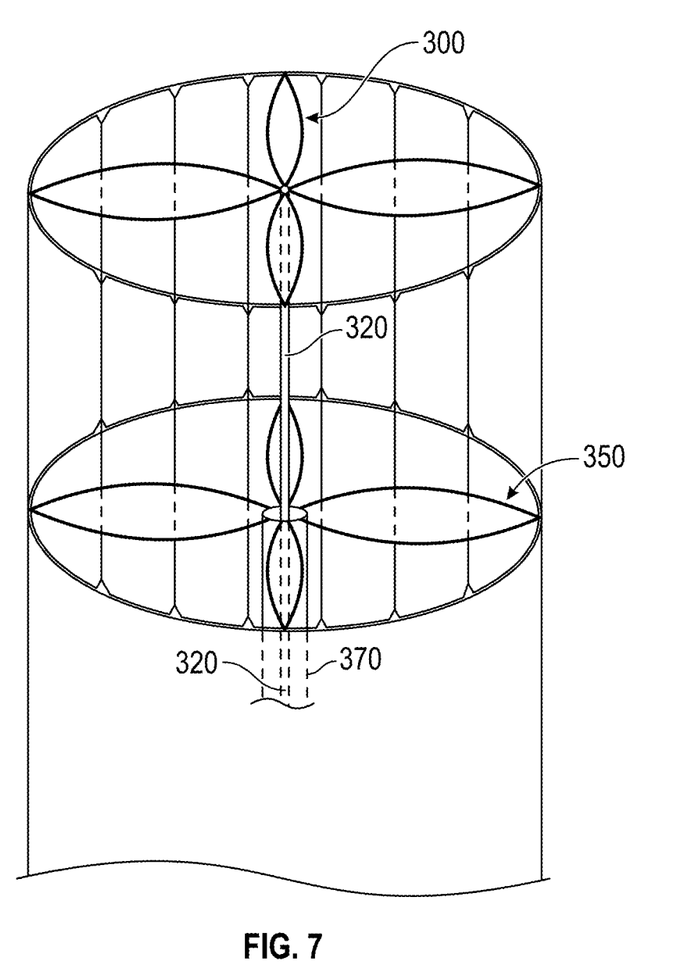
FIG. 7 is a perspective and sectional view of a dual propeller and dual shaft system

Referring to FIG. 7, a duel propeller or dual turbine system is shown with an upper propeller 300 in mechanical connection with a rotational shaft 320, with said rotational shaft disposed within a hollow second rotational shaft of the lower propeller 350. FIG. 7 also shows an upper propeller mounted above the top edge of the cylinder. Such a configuration allows the lower propeller 350 the maximum amount of air flow. The excess air flow rising past the lower propeller may then be utilized by the upper propeller, with the upper propeller disposed an at upper distance so as to not slow down the airflow used by the lower propeller. The upper propeller may be supported by a frame structure and contained in a circular track. The two shafts may separately integrate or be in attachment to the power generator.

Figure 8:
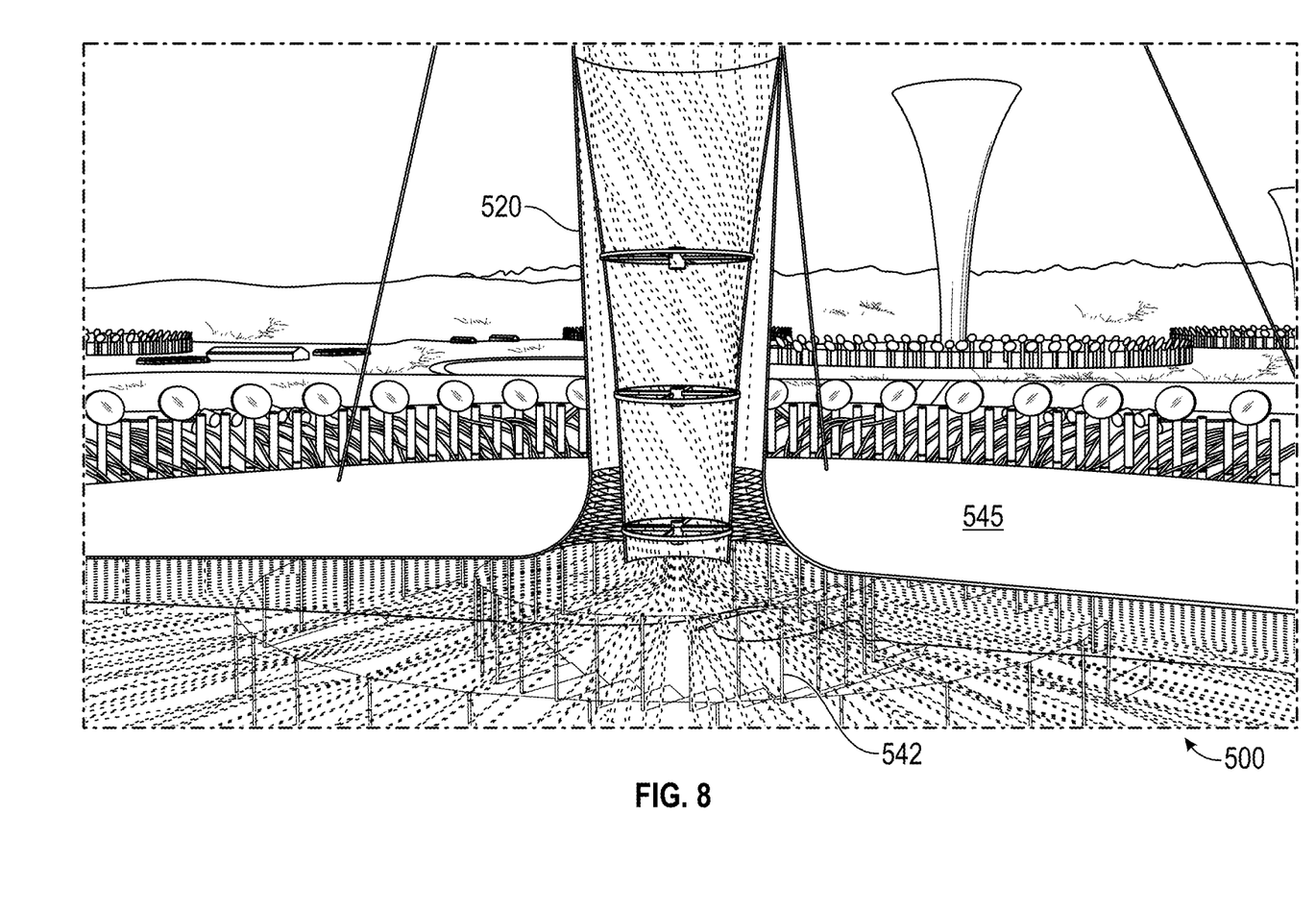
FIG. 8 is a sectional view of a chimney and $CO_2$ removal system

FIG. 8 is a sectional view of a disclosed $CO_2$ removal system 500 using a chimney system and other components integrated with the disclosed elevated cylinder system 100. The artful use of filters combined with the significant air flow achieved by the cylinder system enables the extraction of $CO_2$ on an unprecedented scale as $CO_2$ collectors strip $CO_2$ out of the wind stream of the system.

In general, air is dawn though the fabric 545 covering the perimeter platform skeleton and air is drawn in through the fabric 520 around the frame of the chimney funnel 510.

Figure 9:
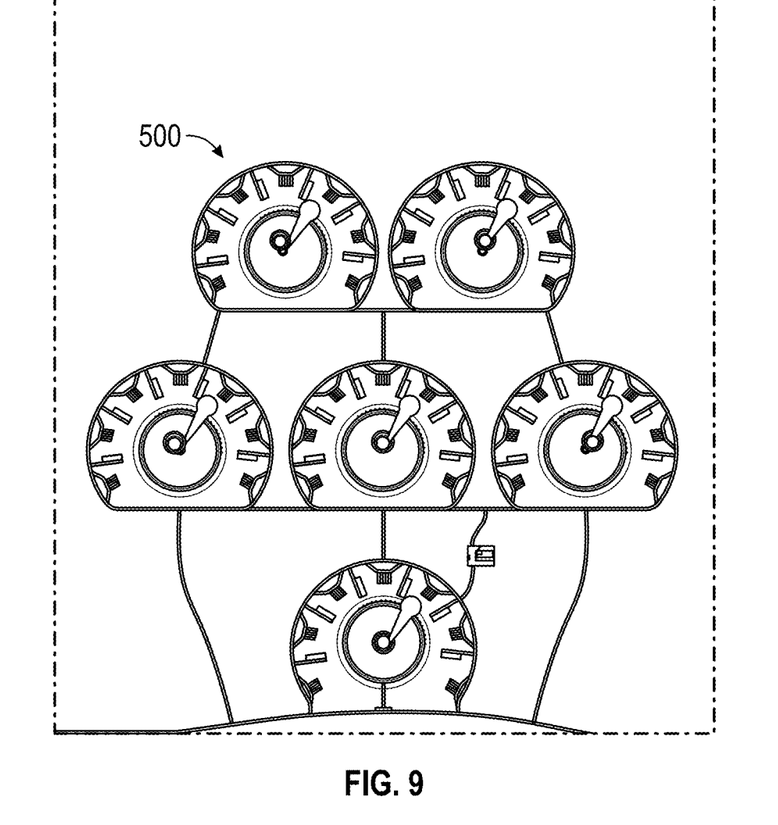
FIG. 9 is a top view of a plurality of chimney $CO_2$ removal systems

FIG. 9 depicts a plurality of disclosed $CO_2$ removal systems 500 connected by roads.

Figure 10:
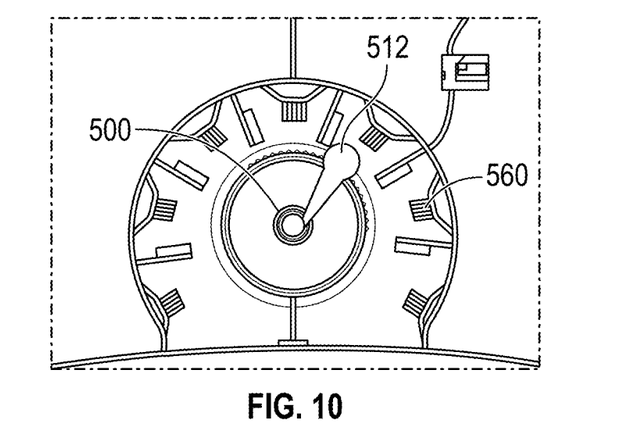
FIG. 10 is an expanded top view of a chimney $CO_2$ removal system and related components

FIG. 10 depicts one disclosed $CO_2$ removal system that includes a plurality of $CO_2$ and water storage containers 560.

Figure 11:
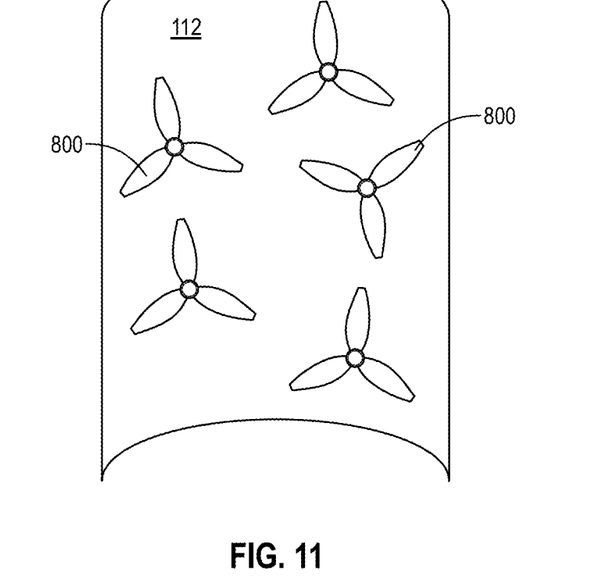
FIG. 11 is a sectional view of free wheeling blades in rotational attachment to the inside wall of a cylinder.

FIG. 11 depicts a interior free wheeling fan blade embodiment. The free wheeling fan blades 800 may be in rotational attachment to the interior 112 of a cylinder. The fan blades may have alternative spin directions and alternate spin ratio fan blades rotational attached to horizontal posts within the cylinder.

The freewheeling fan blades may automatically spin due to their positions inside the vertical tornadic airflow convection. These blades create air turbulence in and around the edges and midsections of the tornadic airflow which forces the convection air to "bounce" onto and to be "repelled" off of the cylinder's hot walls. The freewheeling wind blade's air turbulences increase the airflow's overall turbulent conditions which therefore additionally intermingles heat transfer off the hot interior cylinder walls for mixture into the cylinder's overall vertical airflow procedures.

Figure 12:
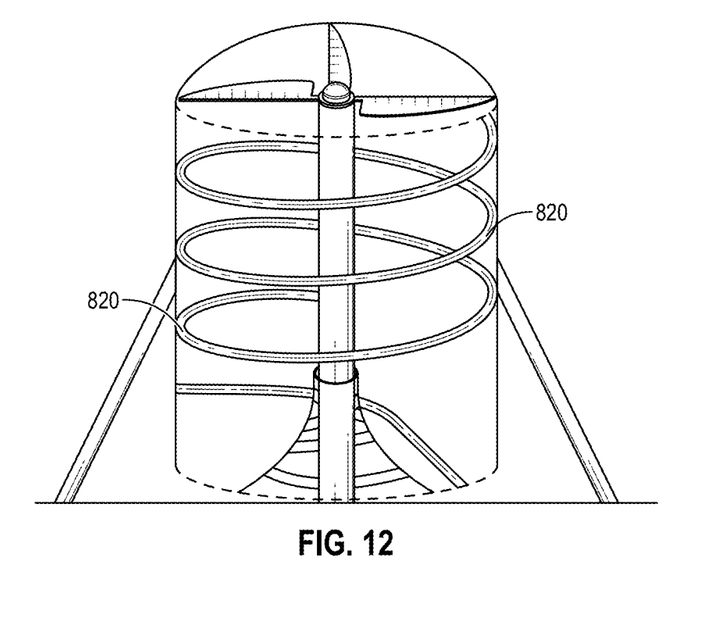
FIG. 12 is a perspective view of a flexible vane or flap embodiment

FIG. 12 depicts flexible vanes or flaps disposed within a cylinder, although an external embodiment is contemplated. The flexible vanes or flaps may be powered by hydraulic or electric motors, computer program controlled, interior and/or exterior vertical, horizontal or other angle vanes/flaps that alter their shape and forms to channel and influence airflow directions and speeds at different times of day.

Figure 13:
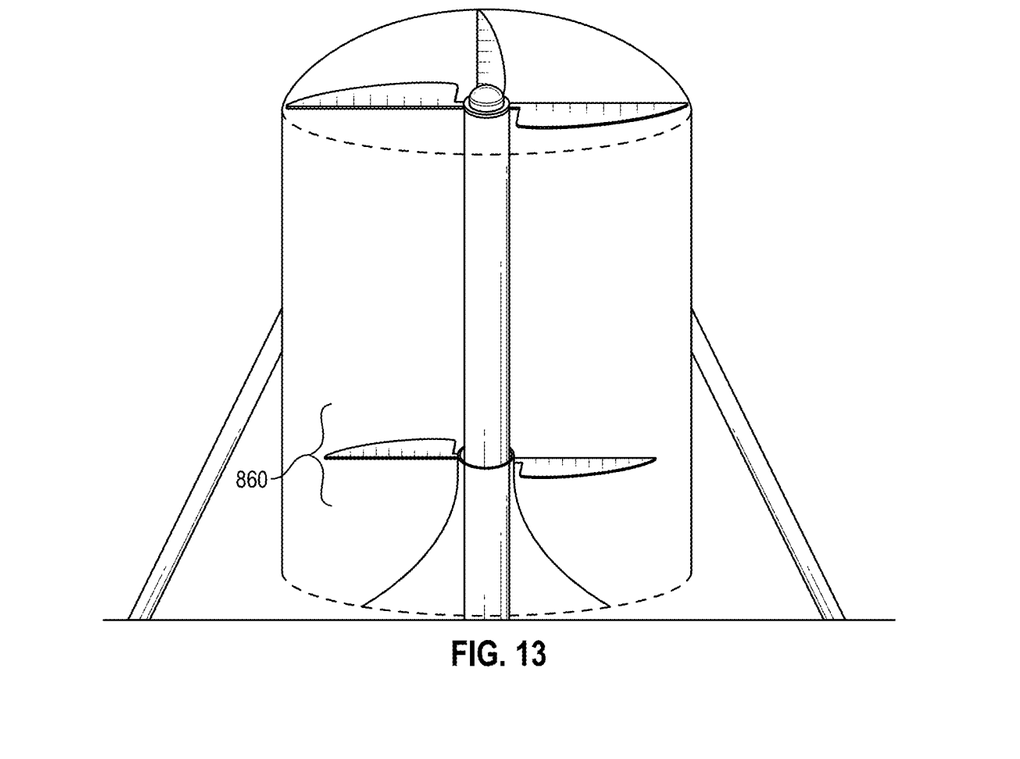
FIG. 13 is a sectional view of a two propeller embodiment

FIG. 13 depicts a wind blade turbine 860 on top of a reverse cone pyramid structure. The wind blade turbine 860 may be hydraulically or electrically powered or freewheeling, and may be disposed atop a cone pyramid structure as shown in FIG. 13. The wind blade 860 will increase airflow turbulence and airflow tornadic spiral inside cylinder bottom area. The wind blade could also be utilized for additional input toward generating electric energy.

Figure 14:
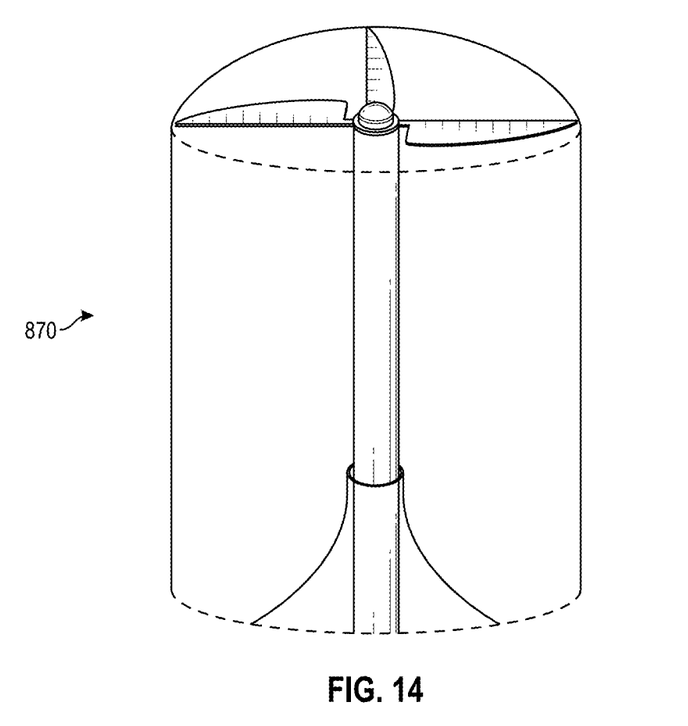
FIG. 14 is a sectional view of an embedment near a heat sink

FIG. 14 depicts an embodiment near a heat sink

Figure 15:
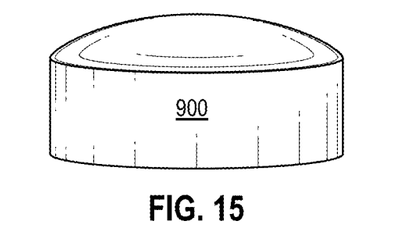
FIG. 15 is a perspective view of a first heat sink
Figure 16:
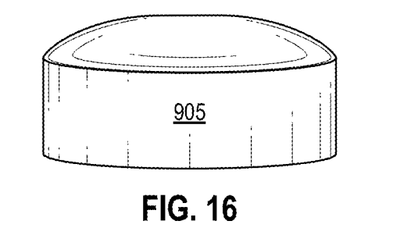
FIG. 16 is a perspective view of a second heat sink

FIG. 15 and FIG. 16 depict embodiments of a heat sink. A heat sink may comprise molten salt, water mixtures, stone beds, etc.; for additional airflow warmings. These heat-sinks may be positioned at and around areas of geographies where the disclosed embodiments are located. The heat sinks' retained heat will be increased during sunshine hours and released during darkened hours for keeping the airflow active inside the disclosed embodiments.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A system (100) to generate electricity, the system comprising:
   a) a cylinder comprising a circular cylinder wall, an interior surface (114), an exterior surface (112), an upper end (115), a lower end (117), an upper void (116) defined by the circular cylinder wall at the upper end, and a lower void (118) defined by the circular cylinder wall at the lower end;
   b) a first propeller disposed within the cylinder, the first propeller attached to a first rotational shaft (320), the first rotational shaft attached to a power generator, wherein the first propeller comprises a plurality of blades and each respective blade comprises a distal edge (360) and each respective distal edge is retained by a wind blade void (120) with the wind blade void defined within the inner surface of the cylinder wall; and;
   c) a wind and shaft support cone (200) disposed within the cylinder, wherein the system is configured to heat the air within the cylinder for continuous air flow to rotate the first propeller and the first rotational shaft to thereby generate the electricity;
   d) a heat sink disposed within the cylinder.

2. The system of claim 1 wherein the cylinder is positioned above ground level.

3. The system of claim 2 wherein portions of the first rotational shaft are disposed within the wind and shaft support cone.

4. The system of claim 3 further including a plurality of parabolic concave mirrors directed towards the cylinder.

5. The system of claim 1 wherein the wind and shaft support cone defines an upper void defined by an upper end of the shaft and support cone, the upper void having a smaller circumference as compared to a lower void, the lower void defined by a lower end of the wind and shaft support cone.

6. The system of claim 5 wherein the lower end of the wind and shaft support cone is disposed at ground level.

7. The system of claim 6 wherein the cylinder is supported above ground level by use of a support structure.

8. The system of claim 7 further including a second propeller within the cylinder, the second propeller disposed below the first propeller, the second propeller attached to a second rotational shaft, the second rotational shaft defining a center void wherein the first rotational shaft is disposed within the center void of the second rotational shaft and the second rotational shaft is attached to the power generator.

9. The system of claim 7 wherein the first propeller is disposed above the upper end of the cylinder and a second propeller is disposed at the upper end of the cylinder and the second propeller is connected to a second rotational shaft and wherein the first rotational shaft is disposed within a void defined by the second shaft and the first rotational shaft and second rotational shaft are connected to the power generator.

10. The system of claim 1 wherein the cylinder is positioned upon the ground and vents at the bottom of the cylinder allow air to flow into the cylinder.

* * * * *